H. M. DUDLEY.
FABRIC TREATING DEVICE.
APPLICATION FILED JAN. 22, 1919.

1,334,528.

Patented Mar. 23, 1920.
9 SHEETS—SHEET 1.

INVENTOR
Howard M. Dudley
BY Howard Freeman
his ATTORNEY

H. M. DUDLEY.
FABRIC TREATING DEVICE.
APPLICATION FILED JAN. 22, 1919.

1,334,528.

Patented Mar. 23, 1920.
9 SHEETS—SHEET 7.

INVENTOR
BY
his ATTORNEY

UNITED STATES PATENT OFFICE.

HOWARD M. DUDLEY, OF PHILADELPHIA, PENNSYLVANIA.

FABRIC-TREATING DEVICE.

1,334,528.  Specification of Letters Patent. Patented Mar. 23, 1920.

Application filed January 22, 1919. Serial No. 272,461.

*To all whom it may concern:*

Be it known that I, HOWARD M. DUDLEY, a citizen of the United States, residing in the city of Philadelphia, county of Philadelphia, and State of Pennsylvania, have invented certain new and useful Improvements in Fabric-Treating Devices, of which the following is a full, clear, and exact specification.

My invention relates to devices suitable for the treatment of textile fibers and fabrics and refers particularly to devices in which the fiber or fabric is treated with moving fluids.

One object of my invention is a device in which textile fiber and fabrics may be dyed, dry-cleaned, after-treated, oxidized, washed and the greater portion of the liquid removed therefrom by centrifugal motion, without manual handling of the goods during the complete series of operations.

Another object of my invention is a device in which fabrics may be dry cleaned or treated with liquids or gases, and the liquids or gases removed without loss.

Another object of my invention is a fabric treating device in which the accidental conflagrations will be automatically extinguished.

My device, therefore, has incorporated within it means for producing effects which are now obtainable only by the use of a number of different machines.

My device thus presents a means whereby the described results can be obtained in an economical and efficient manner, thus saving a very considerable amount of time and labor and of the other expenses incident to the running of a number of different machines.

Another object of my invention is a device whereby the produced effects in the fabric chamber may be judged without opening the fabric chamber or disturbing the contents thereof.

In the accompanying drawings, illustrating one form of my device, similar parts are designated by similar numerals.

The particular form of the device of my invention, shown in the accompanying drawings, comprises a dyeing receptacle 20, having the cylindrical side 21, the conical end 22 and the end 23. Within the receptacle is a series of annular channel members 24, 24, integral with the side 21. Each end channel member 24 carries a series of revoluble flanged wheels 25, 25 while the central channel member 24 carries a series of revoluble flanged wheels 26, 26 situated intermediate of the revoluble wheels 25, 25 of the end channels. These wheels 25, 25, 26, 26 are revoluble upon the balls 28, 28 in the ball-bearings 29, 29.

Within the dyeing receptacle 20 is a fabric chamber comprised of the hollow conical end 30 and the end 31. The end 30 carries a series of extended arms 101, 101, supporting an annular member 102 which is revoluble upon the rollers 25, 25, 25. The annular end 31 has an extended annular member 103 which is revoluble upon the rollers 25, 25, 25. The central portion of the dyeing chamber has the extended arms 104, 104, carrying the annular member 105 revoluble upon the rollers 26, 26, 26. A series of spaced bars 32, 32, four in the device shown, extend longitudinally between the ends 30 and 31 and radially from the center forming four compartments, the bottoms of which are formed by the spaced parallel bars 32', 32'. Situated intermediate of the ends 30 and 31 are four ring-shaped bars 33, 33, 33, 33 which are supported on the ends 30 and 31 by the bars 34, 34, 34. A portion of each bar 33 has a split portion 35, the split portion 35 of each pair of bars 33, 33 being attached to each other by bars 36, 36, forming a cover which is hinged at 37 to a bar 34. Intermediate of the ends 30 and 31 and between the central rods 33, 33 is a series of members 38, 38 attached to the rods 33. Each of a series of members 38, 38 has an extended member 39 and a flange member 40, forming the lock bar recesses 41, 41, the members 38, 38 of the series being attached to each other by the annular member 42. A series of spaced bars 43, 43 connect the two end rods 33, 33 with the ends 30 and 31. A pair of bars 43, 43 carries a series of cored members 45, 45, the opening 46 of each being in alinement with a lock bar recess 41. A removable locking cover 47, having a shoulder 48, fits over the cored member 45, the cover 47 carrying a screw bolt 49 which threads within a threaded opening in the cored member 45.

A locking bolt 50 has the two set collars 51 and 52, the bolt being capable of insertion within the lock bar recess 41 and the cored opening 46 in the member 45. The collars 51 and 52 are so situated with respect to each other that the bolt 50 may be moved inwardly into the opening 46 in order to release the bolt 50 from the recess 41 and the bolt 50 may be removed from the opening 46. When the bolt 50 is in position in the recess 41 and the opening 46, it may be retained in position by means of the screw bolt 49 thus locking the compartment cover in a closed position. A similar locking means is employed for each cover.

Figures 1, 2, 3:
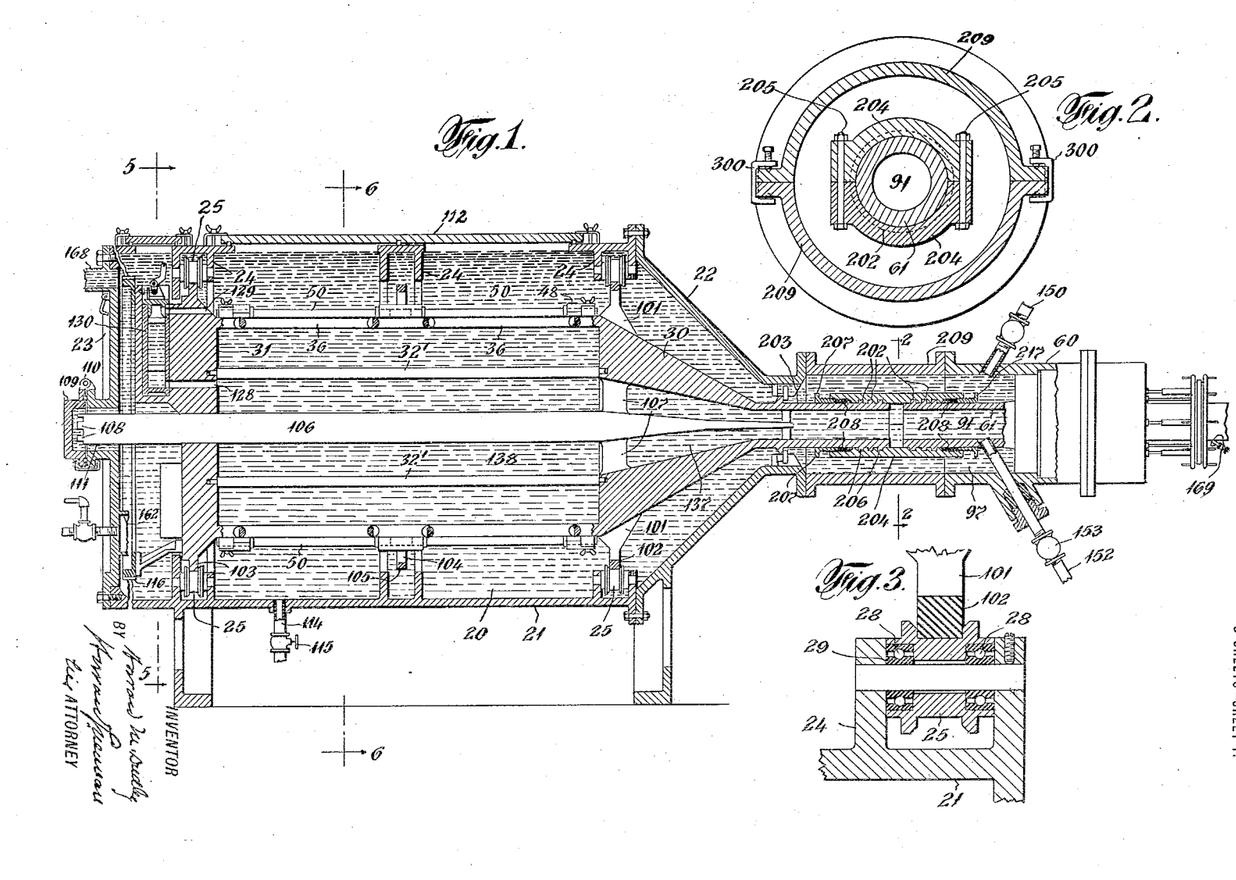
Figure 1 is a vertical cross-section of one form of the device of my invention.
Fig. 2 is a section through the line 2—2 of Fig. 1.
Fig. 3 is an enlarged section of one of the roller bearings of the device.
Figure 4:
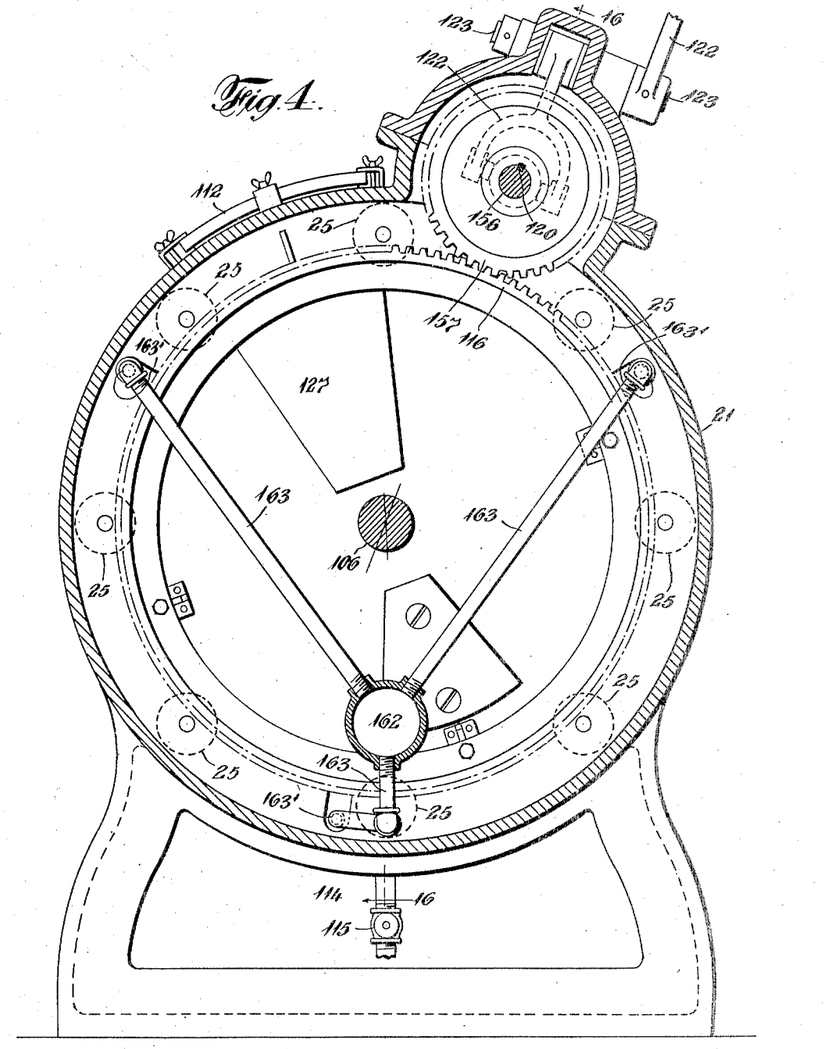
Fig. 4 is a section through the line 4—4 of Fig. 16.
Figure 5:
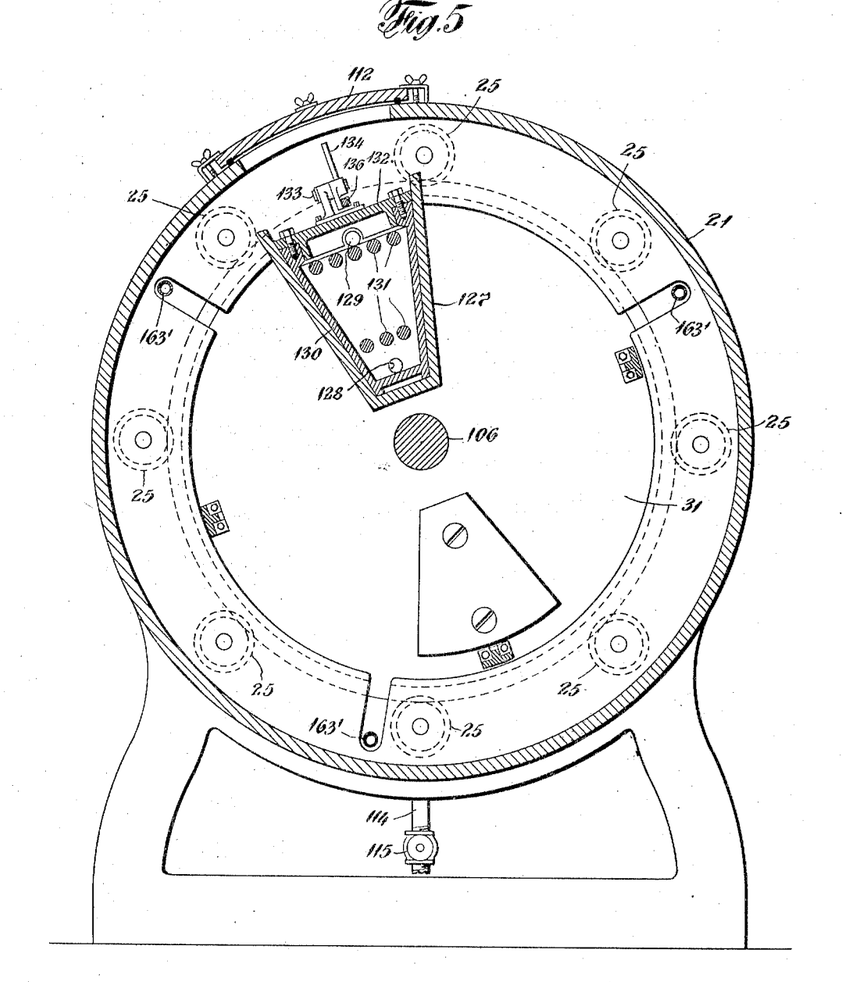
Fig. 5 is a section through the line 5—5 of Fig. 1.
Figure 6:
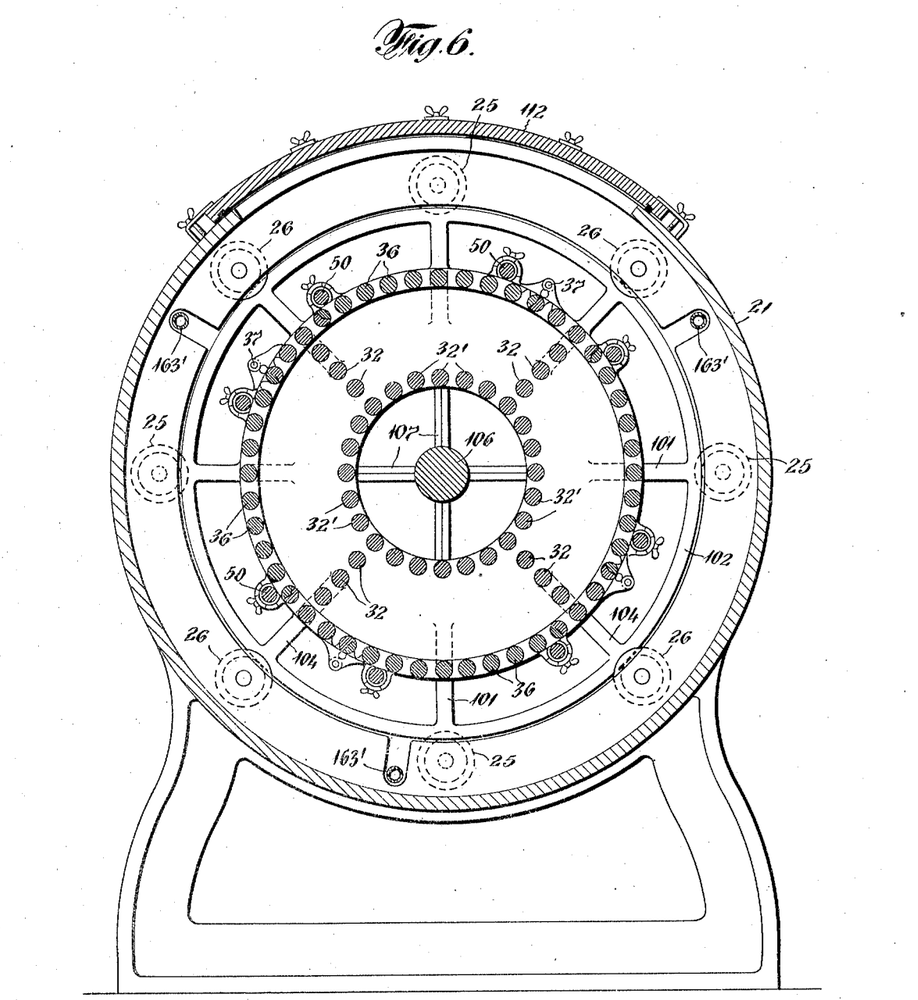
Fig. 6 is a section through the line 6—6 of Fig. 1.
Figure 7:
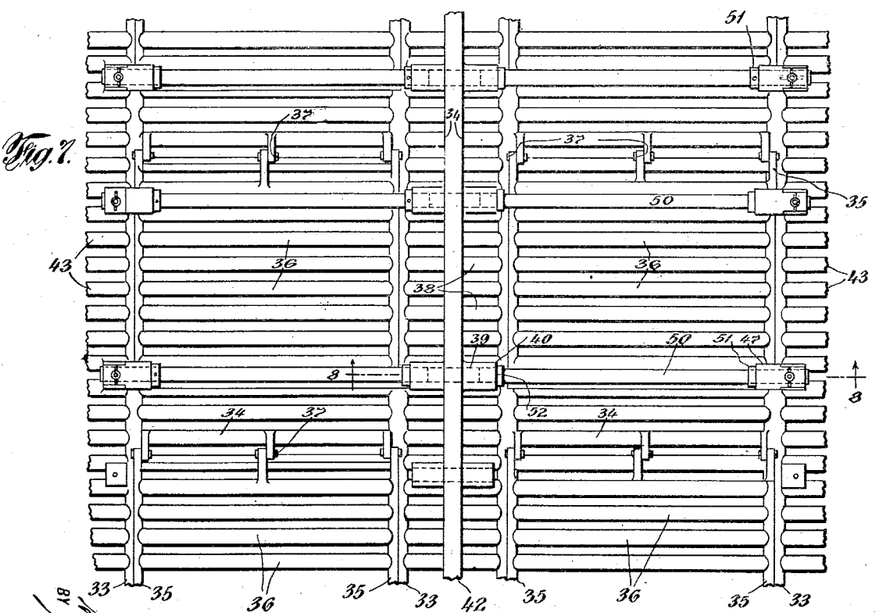
Fig. 7 is a broken enlarged development of a portion of the fabric chamber.
Figure 8:
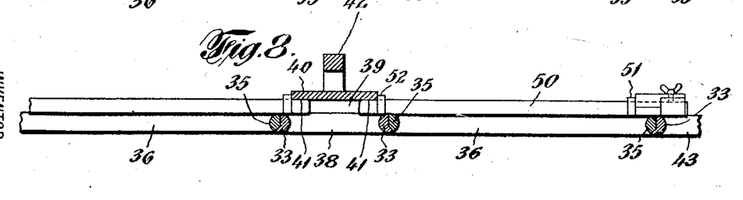
Fig. 8 is a section through the line 8—8 of Fig. 7.
Figure 9:
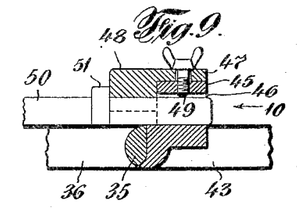
Fig. 9 is an enlarged portion of Fig. 8 showing the locking means.
Figure 10:
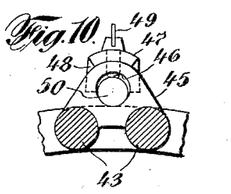
Fig. 10 is a view in the direction of the arrow 10 of Fig. 9.
Figure 11:
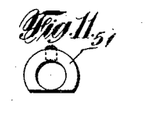
Fig. 11 is a detail section of the bar-locking cover.
Figure 12:
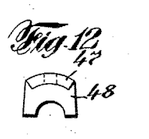
Fig. 12 is a detail section of the clamp-holding bar in position.
Figure 13:
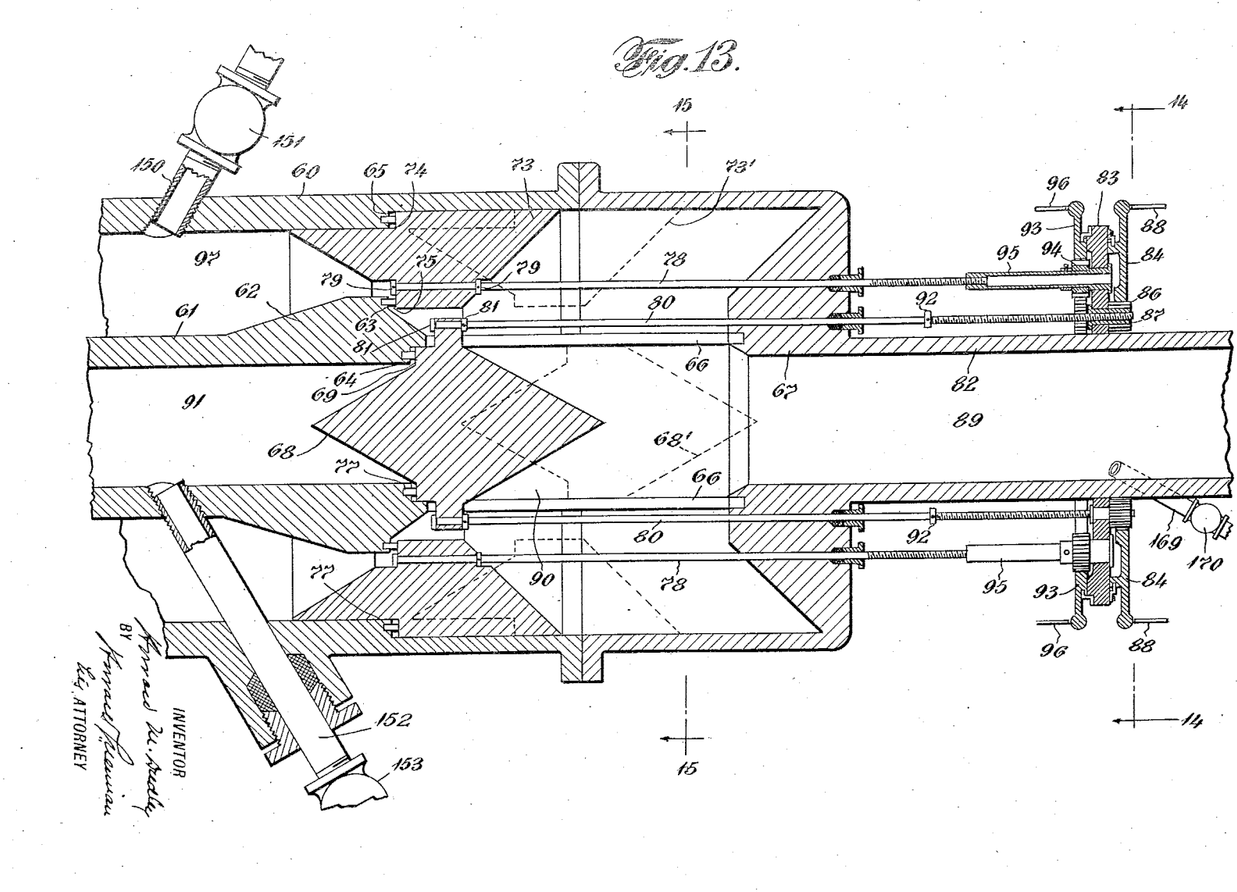
Fig. 13 is a vertical cross-section of the valve.
Figure 14:
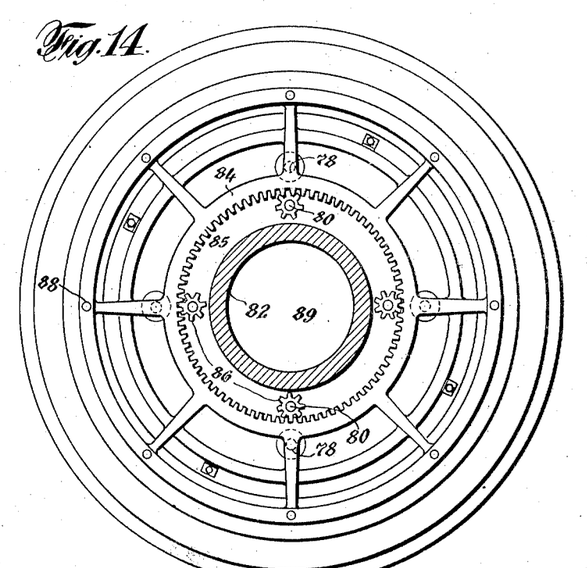
Fig. 14 is a section through the line 14—14 of Fig. 13.
Figure 15:
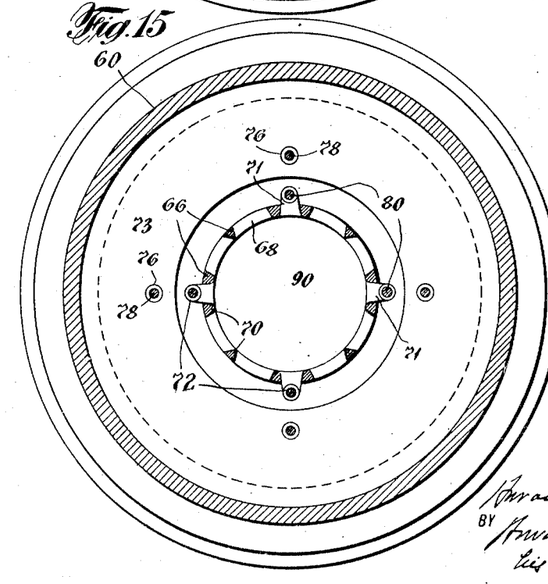
Fig. 15 is a section through the line 15—15 of Fig. 13.

The valve comprises the exterior wall 60, made in two parts for purposes of assembling. Centrally located within the valve is a conduit 61, extended into the annular flared portion 62 having the annular shoulders 63 and 64.

The wall 60 has the annular shoulder 65. A series of bars 66, 66 connect the member 62 with the head 67 of the wall 60. A movable valve member 68 has an annular shoulder 69, capable of forming a close engagement with the seat 64 of the member 62. The valve member 68 has a series of recesses 70,70, capable of containing the bars 66, 66 over which the valve member 68 is slidable. The member 68 has a series of extended arms 71, 71, each containing an opening 72. A cylindrical movable valve member 73 has an annular shoulder 74, capable of forming a tight joint with the shoulder 65 of the member 62, and a shoulder 75 capable of forming a tight joint with the shoulder 63 of the member 62. The valve member 73 also contains a series of holes 76, 76. A series of gaskets 77, 77, 77 aid in the formation of the tight joints described above. A series of rods 78, 78 are non-revolubly held in the holes 76, 76 of the valve member 73 and have the set collars 79, 79, and a series of rods 80, 80 are non-revolubly held in the holes 72, 72 of the valve member 68 and have the set collars 81, 81. The upper portions of the rods 78, 78, 80, 80 are threaded. Fixedly attached to the wall 82 of the valve is a collar 83. Revoluble upon one face of the collar 83 is a wheel 84 having the internal gear 85 meshing with the gear 86 carried by the internally threaded revoluble members 87, 87, the threads of each member 87 meshing with the threads of a rod 80. A series of handles 88, 88 facilitate the turning of the wheel 84. The revolution of the wheel 84 revolves the series of gears 86, 86 and the members 87, 87, the movement of the threads of the members 87, 87 moving the rods 80, 80 outwardly, thus removing the valve member 68 from engagement with the member 62 and allowing liquid to pass from the chamber 89 and the chamber 90 into the chamber 91, the member 68 then being in the position 68' shown in dotted lines of Fig. 13. The movement of the rods 80, 80 is checked by the set collars 92, 92. Revoluble upon the other face of the collar 83 is a similar arrangement of parts to move the valve member 73 comprising a revoluble wheel 93, having an interior gear, meshing with the gears 94, 94 carried by the internally threaded members 95, 95 meshing with the threads upon the rods 78, 78. The wheel 93 carries a series of handles 96, 96. The revolution of the wheel 93 moves the rods 78, 78 outwardly, thus removing the valve member 73 from engagement with the member 62 and the shoulder 65 of the member 60 and allowing liquid to pass from the chambers 89 and 90 into the chamber 97, the member 73 then being in the position 73' shown in dotted lines of Fig. 13. When the valve members are in the positions 68 and 73' all of the liquid in chamber 90 will pass through the chamber 97 and when the valve members are in the positions 68' and 73, all of the liquid in chamber 90 will pass through the chamber 91.

Connected with the chamber 97 is a pipe 150 carrying a valve 151 and connected with the chamber 91 is a pipe 152 carrying a valve 153. The two pipes 150 and 152 are connected with a reservoir (not shown)

which in turn is connected to the source of liquid supply.

The valve 60 is connected to the dyeing chamber as follows:—

The end portion of the pipe 61 of the valve carries a series of annular projections 202, 202, as does the pipe extension 203 of the end member 30. Capable of adjustment around the ends of the members 203 and 61 is a split-annular sleeve 204, held together by a series of bolts 205, 205. The interior face of the sleeve 204 has a series of annular projections 206, 206 capable of insertion within the recesses made by the projections 202, 202 of the members 203 and 61. The end portions of the interior face of the sleeve 204 is threaded to receive the threaded collars 207, 207 whereby a tight joint may be made between the sleeve 204 and the member 61, by the aid of gaskets 208, 208. An exterior split cover 209 is connected together by the clamps 300, 300 and abuts upon, and is affixed to, the flanges of the members 60 and 22.

A shaft 106 is fixedly attached to the end 31 and by means of the arms 107, 107 to the end 30. The shaft 106 has a series of projections 108, 108. A gate 109, revoluble at 110, closes the extension 111 of the dyeing chamber.

The dyeing chamber carries removable covers 112 and drain pipe 114 having the valve 115.

Fixedly attached to the end 31 and the shaft 106 is a gear wheel 116. Revolubly carried by the wall 23 is a shaft 117, the fixed pulley-wheel 118 of which is connected with a source of revoluble power.

A gear wheel 119 meshes with the gear wheel 155 of the revoluble sleeve 156 revoluble around the shaft 158. Revoluble with the sleeve 156 is a gear wheel 157 and slidable thereover by means of the spline 120 movable within the recess 121 of the sleeve 156. The arm 122, revoluble around the rock shaft 123 is capable of meshing and unmeshing the gear 157 with the gear 116.

A slidable shaft 124, having projections 125, 125 capable of meshing with the recesses formed by the projections 108, 108 of the shaft 106 carries a fixed pulley 126 connected to a source of revoluble power of great rapidity.

Situated within the dyeing chamber 20 is a small testing device similar and proportionate to one of the compartments of the larger fabric chamber. This comprises a chamber formed by the wall 127 integral with the end 31. This chamber is connected to the interior of the fabric chamber by means of the conduit 128 and to the dyeing chamber outside of the fabric chamber by means of the conduit 129. Revolubly carried by the chamber formed by the wall 127 is a fabric carrying device 130 having an upper and lower series of parallel spaced bars 131, 131 and having a removable top 132. Carried by the top 132 is a revoluble shaft 133 to which is attached the arm 134, having at one end the hole 135, the other end of which carries the pivotal bolt 136, capable of insertion within a recess in the wall 127, the bolt being maintained in a normal extended position by the spring 138, thus holding the fabric device within the chamber. To remove the testing device, gear 157 is shifted from engagement with gear 116, a hook is inserted in the hole 135 and an upward pull applied, which revolves the arm 134 and removes the pin 136 from within the wall 127, allowing the testing device to be withdrawn and the contents thereof may be examined by removing the cover 132.

A steam pipe 160, carrying the valve 161, connects a source of steam with the chamber 162 within the dyeing chamber. The chamber 162 is connected with the three steam pipes 163, 163, 163 extending longitudinally within the dyeing chamber into the pipes 163', 163'. The pipe 160 has the branch pipe 164, the valve 165 of which is connected by means of the rod 166 with the safety cover 167 of the pipe 168 entering into the dyeing chamber. The opening of the safety cover 167 opens the valve 165 and allows steam to enter the pipes 163, 163.

A pipe 169, carrying the valve 170, allows the admission of air into the valve.

The operation of the device is as follows:—

The cover 112 of the dyeing chamber is removed, the lid of one of the fabric compartments is opened and the goods introduced, the lid closed and locked by means of the lock bolt 50, the revoluble dyeing chamber is then revolved to allow another fabric compartment to be loaded with the goods to be treated and this operation repeated until all of the compartments contain fabric. The testing device is loaded with the same material. The cover 112 is closed and locked. The gear 157 is meshed with the gear 116 and rotary motion imparted to the shaft 117, thus revolving the fabric chamber, the shaft 124 being withdrawn from within the dyeing chamber and the gate 109 being closed and locked. The valve 60 is then placed in the position 68', 73 and all of the valves closed with the exception of 151, and liquid, such as a dye liquid, forced through the chamber 89 by any suitable means. The liquid thus passes through the chambers 89, 90, 91, 137 and into the chamber 138 in the center of the fabric chamber reel, the liquid is then forced outwardly through the spaces between the bars 32', 32' into the fabric compartments, free access between the compartments being allowed by the spaces between the bars 32, 32, the liquid being forced through the covers of the compartments into the dyeing chamber. The same process follows with regard to the testing device, the liquid passing through the conduit 128, the contents of the testing device and outwardly through the conduit 129. The liquid passes from the dyeing chamber through the chamber 97 and the pipe 150 to the source of liquid supply for continual circulation.

When it is desired to pass a liquid in an opposite direction to that described, the valve 151 is closed, valve 153 opened and the valve 60 placed in the position 68, 73′. The liquid then passes through the chambers 89 and 97 into the dyeing chamber and thence inwardly through the fabric chambers and through the chambers 138, 137 and 91 into the pipe 152 which conveys it for continual circulation. During this operation the liquid passes through the conduit 129, the testing device and the conduit 128.

When it is desired to determine the condition of the contents of the fabric chambers, a hook is placed in the hole 135 of the arm 134 of the testing device and the testing device withdrawn, the movement of the arm releasing the testing device from its engagement with the wall 127. The contents of the testing device are then examined, and replaced, if necessary.

When the dyeing operation is completed, the gear 157 is shifted from engagement with the gear 116, thus stopping the revolution of the dyeing chamber. The flow of liquid is interrupted, the liquid within the dyeing chamber is removed by opening valve 115, the door 109 is opened, the shaft 124 meshed with the shaft 106, a water tight joint being made by means of the interiorly threaded collar 200 engaging the threads 201 of the shaft 124, and rapid revolution given the shaft 124. This will convert the device into a centrifugal dryer, the liquid within the fabric chambers and within the fabric will be expelled by centrifugal force and the fabric obtained in a condition practically free from excess of moisture. Hot air may be forced or drawn through the fabric by its admission through the pipe 169, thus completely drying the fabric before its removal from the device.

It is evident that liquids other than dyeing liquids may be used, such as dry cleaning fluids; that hot or cold air, or dry cleaning gases may be used and that steam may be introduced, and that in all cases the fabric may be treated with liquids and gases, hydro-extracted and dried without manual handling and that the condition of the goods may be determined without opening the fabric chamber.

Figure 16:
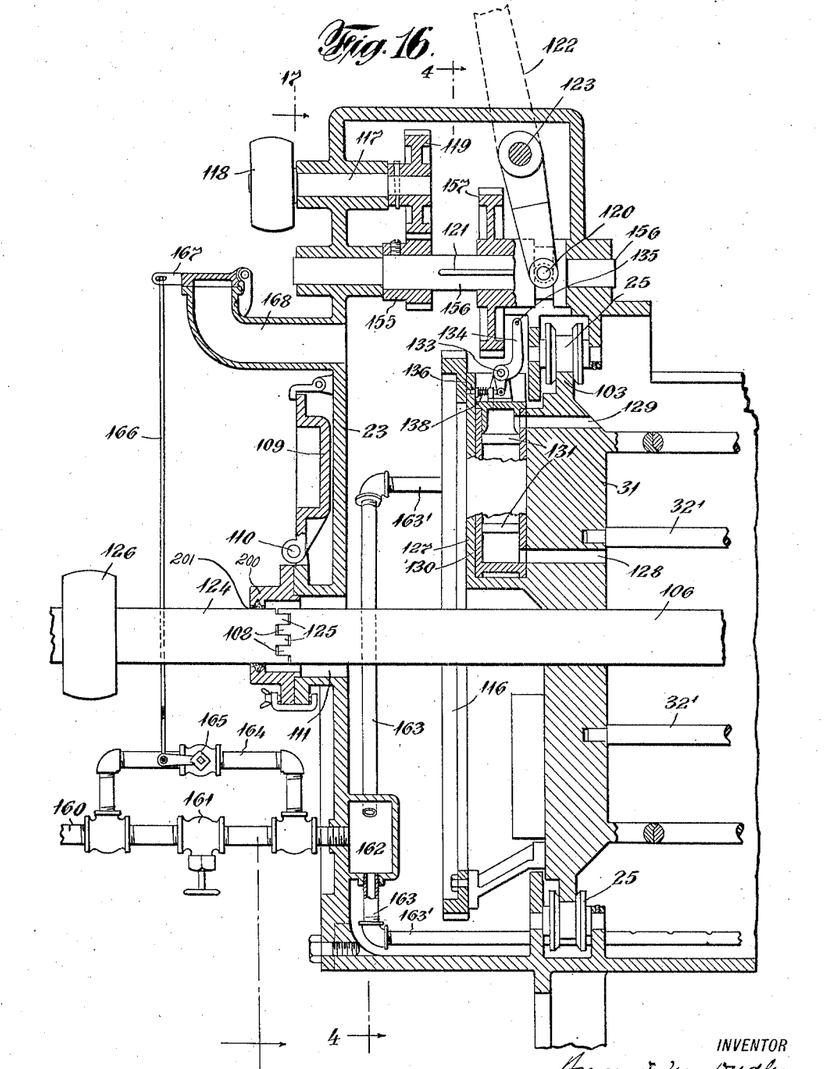
Fig. 16 is a section through the line 16—16 of Fig. 4.
Figure 17:
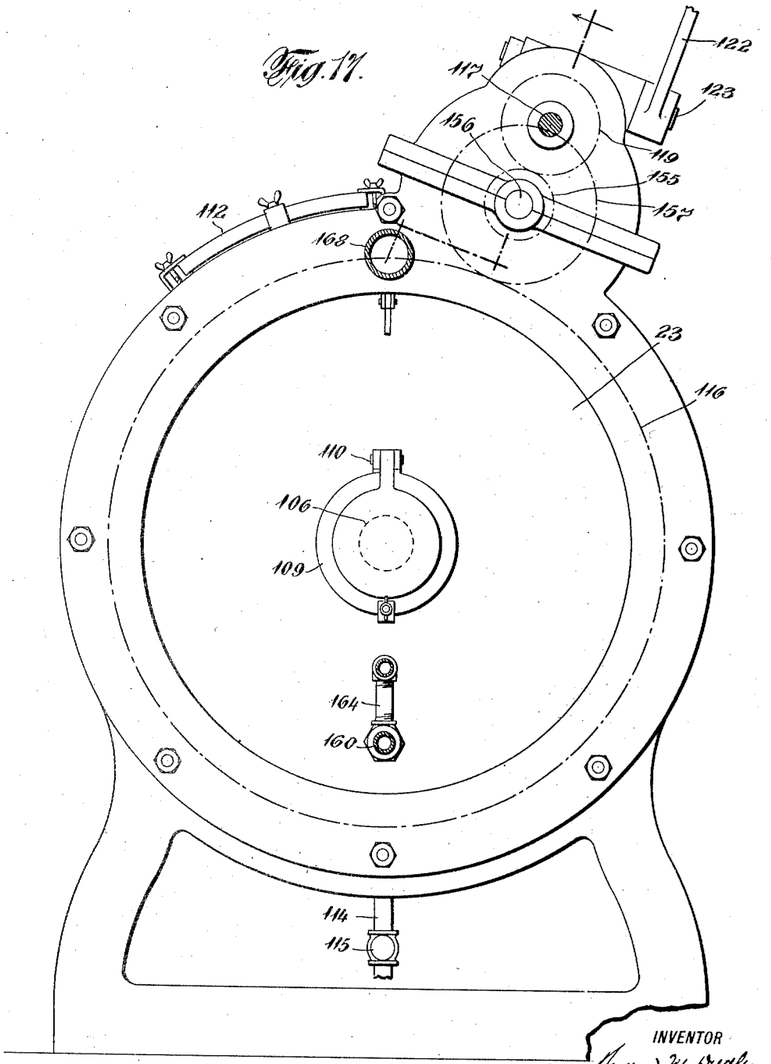
Fig. 17 is a section through the line 17—17 of Fig. 16.

During the dry cleaning of fabrics, it is sometimes necessary to employ liquids, or gases, of an inflammable nature and which are liable to spontaneous combustion during the operation. In order to automatically overcome any fires resulting therefrom, I employ the device shown particularly in Fig. 16. In the event of an explosion, or fire, within the dyeing, or fabric chamber, the safety cover 167 will be blown upwardly, thus raising the rod 166 and opening the valve 165. This movement will admit steam from the pipe 160 into the pipes 163, 163, 163, thus filling the chambers with steam and extinguishing the flames.

I do not limit myself to the particular size, shape, number or arrangement of parts as shown and described, all of which may be varied without going beyond the scope of my invention as described and claimed.

What I claim is:

1. In a fabric treating device, in combination, a dyeing chamber, a revoluble fabric chamber within the dyeing chamber, means for revolving the fabric chamber, means separate from the first revolving means for revolving the fabric chamber at greatly increased speed and means for continuously passing a liquid through the fabric chamber.

2. In a fabric treating device, in combination, a dyeing chamber, a revoluble fabric chamber within the dyeing chamber containing a series of foraminous compartments, means for revolving the fabric chamber, means separate from the first revolving means for revolving the fabric chamber at greatly increased speed and means for continuously passing a liquid through the fabric chamber.

3. In a fabric treating device, in combination, a dyeing chamber, a revoluble fabric chamber within the dyeing chamber, means for revolving the fabric chamber, means separate from the first revolving means for revolving the fabric chamber at greatly increased speed and means for alternately continuously passing a liquid in opposite directions through the fabric chamber.

4. In a fabric treating device, in combination, a dyeing chamber, a revoluble fabric chamber within the dyeing chamber containing a series of foraminous compartments, means for revolving the fabric chamber, means separate from the first revolving means for revolving the fabric chamber at greatly increased speed and means for alternately continuously passing a liquid in opposite directions through the fabric chamber.

5. In a fabric treating device, in combination, a dyeing chamber, a revoluble fabric chamber within the dyeing chamber containing a series of foraminous compartments, means for revolving the fabric chamber, means for disconnecting the revolving means from the chamber, means separate from the first revolving means for revolving the fabric chamber at greatly increased speed, means for connecting the means for revolving at increased speed with the fabric chamber and means for passing a liquid through the fabric chamber.

6. In a fabric treating device, in combination, a dyeing chamber, a revoluble fabric chamber within the dyeing chamber, means for revolving the fabric chamber, means for disconnecting the revolving means from the chamber, means separate from the first revolving means for revolving the fabric chamber at greatly increased speed, whereby the greater portion of the liquid contained in fabric within the dyeing chamber may be eliminated by centrifugal force, means for connecting the means for revolving at increased speed with the fabric chamber and means for passing a liquid through the fabric chamber.

7. In a fabric treating device, in combination, a dyeing chamber, a revoluble fabric chamber within the dyeing chamber containing a series of foraminous compartments, means for revolving the fabric chamber, means for disconnecting the revolving means from the chamber, means separate from the first revolving means for revolving the fabric chamber at greatly increased speed, whereby the greater portion of the liquid contained in fabric within the dyeing chamber may be eliminated by centrifugal force, means for connecting the means for revolving at increased speed with the fabric chamber and means for alternately passing a liquid in opposite directions through the fabric chamber.

8. In a fabric treating device, in combination, a dyeing chamber, a revoluble fabric chamber within the dyeing chamber containing a series of foraminous compartments, means for revolving the fabric chamber, means exterior of the dyeing chamber for disconnecting the revolving means from the chamber, means separate from the first revolving means for revolving the fabric chamber at greatly increased speed, whereby the greater portion of the liquid contained in fabric within the dyeing chamber may be eliminated by centrifugal force, means exterior of the dyeing chamber for connecting the means for revolving at increased speed with the fabric chamber and means for alternately passing a liquid in opposite directions through the fabric chamber.

9. In a fabric treating device, in combination, a dyeing chamber, a revoluble fabric chamber having a series of compartments within the dyeing chamber, said compartments having foraminous sides, a foraminous cover to each compartment, means for locking the cover in a closed position, means for revolving the fabric chamber, separate means for revolving the fabric chamber at greatly increased speed and means for continuously passing a liquid though the dyeing compartments.

10. In a fabric treating device, in combination, a dyeing chamber, a revoluble fabric chamber having a series of compartments formed by parallel spaced bars, a removable cover for each compartment formed by parallel spaced bars, means for locking each cover in a closed position, means for revolving the fabric chamber, separate means capable of revolving the fabric chamber at increased speed whereby the greater portion of the liquid contained in the fabric within the fabric chambers will be expelled by centrifugal force and means for passing a liquid continuously through the fabric chamber.

11. In a fabric treating device, in combination, a dyeing chamber, a revoluble fabric chamber having a series of compartments formed by parallel spaced bars, a removable cover for each compartment formed by parallel spaced bars, means for locking each cover in a closed position, means exterior of the dyeing chamber for revolving the fabric chamber, separate means exterior of the dyeing chamber capable of revolving the fabric chamber at increased speed whereby the greater portion of the liquid contained in the fabric within the fabric chamber will be expelled by centrifugal force and means for passing a liquid continuously and alternately through the fabric chamber in opposite directions.

12. In a fabric treating device, in combination, a chamber, a revoluble fabric chamber within the dyeing chamber, means for revolving the fabric chamber, means separate from the first revolving means for revolving the fabric chamber at greatly increased speed, means whereby an explosion within the dyeing chamber will admit steam into the dyeing chamber and means for continuously passing a liquid through the fabric chamber.

13. In a fabric treating device, in combination, a chamber, a revoluble fabric chamber within the dyeing chamber containing a series of foraminous compartments, means for revolving the fabric chamber, means separate from the first revolving means for revolving the fabric chamber at greatly increased speed, means whereby an explosion within the dyeing chamber will admit steam into the dyeing chamber and means for continuously and alternately passing a liquid in opposite directions through the fabric chamber.

14. In a fabric treating device, in combination, a chamber, a revoluble fabric chamber within the dyeing chamber containing a series of foraminous compartments, means for revolving the fabric chamber, means for disconnecting the revolving means from the chamber, means separate from the first revolving means for revolving the fabric chamber at greatly increased speed, means for connecting the means for revolving at increased speed with the fabric chamber, means whereby an explosion within the dyeing chamber will admit steam into the dyeing chamber and means for passing a liquid alternately in opposite directions through the fabric chamber.

15. In a fabric treating device, in combination, a chamber, a revoluble fabric chamber within the dyeing chamber containing a series of foraminous compartments, means for revolving the fabric chamber, means exterior of the dyeing chamber for disconnecting the revolving means from the chamber, means separate from the first revolving means for revolving the fabric chamber at greatly increased speed whereby the greater portion of the liquid contained in fabric within the dyeing chamber may be eliminated by centrifugal force, means exterior of the dyeing chamber for connecting the means for revolving at increased speed with the fabric chamber, means whereby an explosion within the dyeing chamber will admit steam into the dyeing chamber and means for passing a liquid alternately in opposite directions through the fabric chamber.

16. In a fabric treating device, in combination, a chamber, a revoluble fabric chamber having a series of compartments formed by parallel spaced bars, a removable cover for each compartment formed by parallel spaced bars, means for locking each cover in a closed position, means exterior of the dyeing chamber for revolving the fabric chamber, separate means exterior of the dyeing chamber capable of revolving the fabric chamber at increased speed whereby the greater portion of the liquid contained in the fabric within the fabric chamber will be expelled by centrifugal force, means whereby an explosion within the dyeing chamber will admit steam into the dyeing chamber and means for passing a liquid continuously and alternately through the fabric chamber in opposite directions.

17. In a fabric treating device, in combination, a dyeing chamber, a revoluble fabric chamber within the dyeing chamber, means for revolving the fabric chamber, means separate from the first revolving means for revolving the fabric chamber at greatly increased speed and means whereby a liquid and gas may be continuously passed through the fabric chamber.

18. In a fabric treating device, in combination, a dyeing chamber, a revoluble fabric chamber within the dyeing chamber, means for revolving the fabric chamber, means separate from the first revolving means for revolving the fabric chamber at greatly increased speed and means for alternately continuously passing a liquid and gas in opposite directions through the fabric chamber.

19. In a fabric treating device, in combination, a dyeing chamber, a revoluble fabric chamber within the dyeing chamber, means for revolving the fabric chamber, means for disconnecting the revolving means from the chamber, means for revolving the fabric at greatly increased speed whereby the greater portion of the liquid contained in fabric within the dyeing chamber may be eliminated by centrifugal force, means for connecting the last mentioned revolving member with the fabric chamber and means for passing a liquid and gas through the fabric chamber.

20. In a fabric treating device, in combination, a dyeing chamber, a revoluble fabric chamber having a series of compartments within the dyeing chamber, said compartments having foraminous sides, a foraminous cover to each compartment, means for locking the cover in a closed position, means for revolving the fabric chamber, separate means for revolving the fabric chamber at greatly increased speed and means whereby a liquid and gas may be continuously passed through the dyeing compartments.

21. In a fabric treating device, in combination, a dyeing chamber, a revoluble fabric chamber having a series of compartments formed by parallel spaced bars, a removable cover for each compartment formed by parallel spaced bars, means for locking each cover in a closed position, means for revolving the fabric chamber, separate means capable of revolving the fabric chamber at increased speed whereby the greater portion of the liquid contained in the fabric within the fabric chambers will be expelled by centrifugal force and means whereby a liquid and gas may be continuously passed through the fabric chamber.

Signed at New York city in the county of New York and State of New York this 18th day of January, 1919.

HOWARD M. DUDLEY.